US011249601B2

(12) United States Patent
Yamamoto et al.

(10) Patent No.: US 11,249,601 B2
(45) Date of Patent: Feb. 15, 2022

(54) INPUT/OUTPUT DEVICE

(71) Applicant: Nippon Telegraph and Telephone Corporation, Tokyo (JP)

(72) Inventors: Tsuyoshi Yamamoto, Tokyo (JP); Toshishige Shimamura, Tokyo (JP); Yuichi Okabe, Tokyo (JP); Yuzo Ishii, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/056,252

(22) PCT Filed: May 13, 2019

(86) PCT No.: PCT/JP2019/018932
§ 371 (c)(1),
(2) Date: Nov. 17, 2020

(87) PCT Pub. No.: WO2019/225380
PCT Pub. Date: Nov. 28, 2019

(65) Prior Publication Data
US 2021/0181874 A1 Jun. 17, 2021

(30) Foreign Application Priority Data
May 24, 2018 (JP) .............................. JP2018-099380

(51) Int. Cl.
*G06F 3/01* (2006.01)
*G06F 3/044* (2006.01)
*G06F 3/0488* (2013.01)

(52) U.S. Cl.
CPC .............. *G06F 3/044* (2013.01); *G06F 3/016* (2013.01); *G06F 3/04883* (2013.01); *G06F 2203/04102* (2013.01)

(58) Field of Classification Search
CPC ...... G06F 3/016; G06F 3/044; G06F 3/04883; G06F 2203/04102
See application file for complete search history.

(56) References Cited

U.S. PATENT DOCUMENTS 5,596,656 A    1/1997   Goldberg
10,642,356 B1*  5/2020   Wang ...................... G06F 3/011
(Continued)

FOREIGN PATENT DOCUMENTS

JP    2001029485 A    2/2001
JP    2014228959 A    12/2014

OTHER PUBLICATIONS

Google Advanced Technology Projects, Jacquard by Google, Levi's Collaboration, Web Literature: https://atap.google.com/jacquard//levi, Apr. 13, 2018 (Reading Day), 10 pages.
(Continued)

*Primary Examiner* — Ryan A Lubit
(74) *Attorney, Agent, or Firm* — Slater Matsil, LLP

(57) ABSTRACT

A locus detection unit detects a locus traced by an input unit that is attached to a body. A pattern determination unit determines an input pattern based on the locus detected by the locus detection unit. A transmission unit transmits the input pattern determined by the pattern determination unit as input information to an external device. A reception unit receives output information transmitted from the external device. A tactile output unit provides, to the body, the output information received by the reception unit as a simulated tactile sense of the skin being traced.

14 Claims, 3 Drawing Sheets

(56) References Cited

U.S. PATENT DOCUMENTS

| | | | |
|---|---|---|---|
| 2012/0242584 A1* | 9/2012 | Tuli | G06F 3/016 |
| | | | 345/173 |
| 2016/0358380 A1* | 12/2016 | Yeom | G06T 19/006 |
| 2018/0321750 A1* | 11/2018 | Balint | G06F 3/0231 |
| 2018/0365477 A1* | 12/2018 | Seol | H04M 1/725 |
| 2019/0112734 A1* | 4/2019 | Podhajny | A41D 1/005 |

OTHER PUBLICATIONS

Jikui, Japan Automobile Federation, "While smartphone while walking," Web Literature: http://www.jaf.or.jp/eco-safety/safety/usertest/smt/detail1.htm, Apr. 13, 2018 (Reading Day), 5 pages.

Japan Stenography Association, Stenographic Word Book, Shorthand vocabulary, Web Literature: http://www.sokki.or.jp/sokki/tango/, Apr. 13, 2018 (Reading Day), 4 pages.

Nippon Telegraph Corp., "First presentation at SXSW 2018 of the "Comptics" concept, which allows users to design and experience music, video and tactile content," First show at SXSW 2018, Mar. 9, 2018, 6 pages.

Renesas, "CTSU Capacitive Touch Detection Basics," Application Notes, RRX113 Group, 30 AN0218 JJ0100 Rev. 1.00, Dec. 25, 2014, 66 pgs.

* cited by examiner

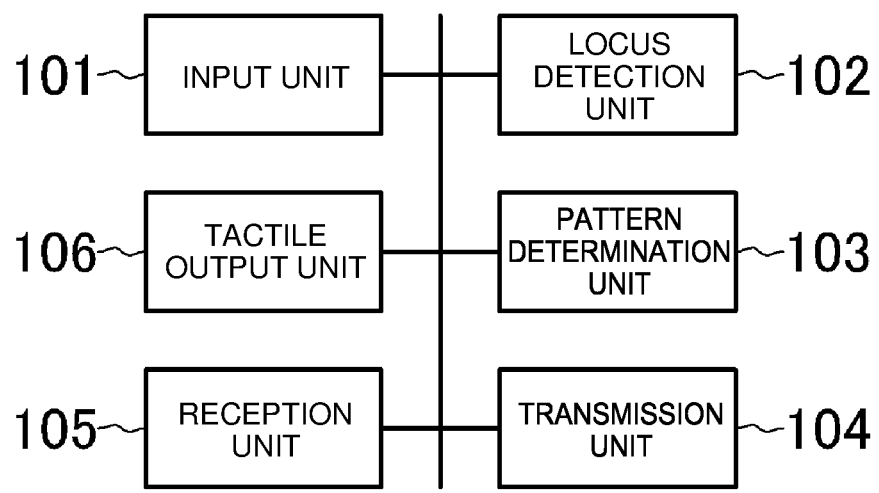
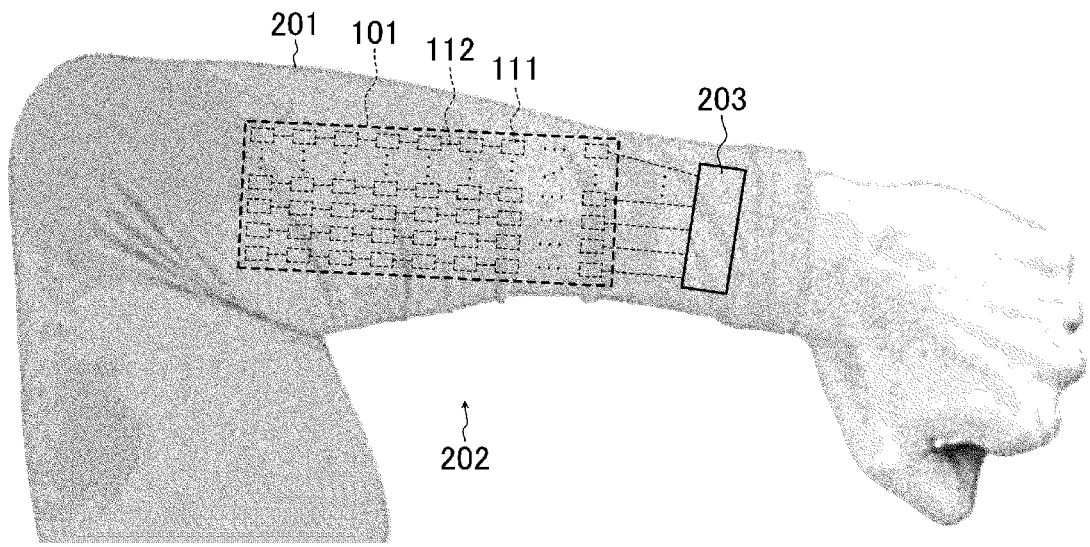

Fig. 4

INPUT/OUTPUT DEVICE

CROSS-REFERENCE TO RELATED APPLICATIONS

This application is a national phase entry of PCT Application No. PCT/JP2019/018932, filed on May 13, 2019, which claims priority to Japanese Application No. 2018-099380, filed on May 24, 2018, which applications are hereby incorporated herein by reference.

TECHNICAL FIELD

The present invention relates to a wearable input/output device.

BACKGROUND

Portable small IT devices typified by smartphones and wristwatch-type computers have become widespread. For the operation of these portable devices, a touch panel and a keyboard integrated with an output display installed in each device are used. On the other hand, it has been pointed out that when operating a touch panel or a keyboard, a user falls into a visually insensitive state. For example, accidents such as falling from a platform of a station or colliding with surrounding pedestrians frequently occur when operating a smartphone while walking, and this has become a social problem (Non-Patent Literature 1).

As a means for operating a smartphone safely while walking or riding a bicycle, a device using as an input interface, an apparatus that detects a gesture such as a touch operation has been proposed (refer to Non-Patent Literature 2).

CITATION LIST

Patent Literature

Patent Literature 1: U.S. Pat. No. 5,596,656

Non-Patent Literature

Non-Patent Literature 1: JAF user test, "Smartphone operation while walking", Japan Automobile Federation, [Searched on May 11, 2018] (http://www.jaf.or.jp/eco-safety/safety/usertest/smt/detail1.htm).

Non-Patent Literature 2: "Jacquard", Google Advanced Technology Projects, [Searched on May 11, 2018], (https://atap.google.com/jacquard/levi/).

Non-Patent Literature 3: "Stenography Word Book", Japan Stenography Association, [Searched on May 11, 2018], (http://www.sokki.or.jp/sokki/tango/).

Non-Patent Literature 4: "Basics of CTSU Capacitive Touch Detection", RENESAS Application Note, R30AN0218JJ0100, Rev 1.00, 2014, [Searched on May 11, 2018], (https://www.renesas.com/ja-jp/doc/products/mpumcu/apn/rx/002/r30an0218jj0100 rx113.pdf).

Non-Patent Literature 5: "The concept "Comptics" that allows users to design and experience contents that add a tactile sense to music and video will be unveiled at SXSW2018", NTT Corporation News Release, Mar. 9, 2018, [Searched on May 11, 2018] (http://www.ntt.co.jp/news2018/1803/180309a.html).

SUMMARY

Technical Problem

In the above-described prior art, detection of a gesture corresponding to an input from a portable device or the like is performed using a yarn having conductivity woven into a cuff of a garment. With this technique, only simple actions such as "tapping a cuff" and "swiping (rubbing)" can be detected. Further, in the above-described technique, another output interface such as a voice or a smartphone display is required to obtain a feedback for the input. For this reason, in the prior art, it is not easy to input complicated (detailed) information, and there is a problem that a user may fall into a visually insensitive state during operation.

Embodiments of the present invention have been made to solve the above-described problems, and it is an object of embodiments of the present invention to allow more complicated information to be input/output in a state in which falling into a visually insensitive state is suppressed.

Means for Solving the Problem

An input/output device according to embodiments of the present invention includes a locus detection unit that detects a locus traced by an input unit attached to a body, a pattern determination unit that determines an input pattern based on the locus detected by the locus detection unit, and a transmission unit that transmits the input pattern determined by the pattern determination unit as input information, a reception unit that receives output information, and a tactile output unit that provides, to the body, the output information received by the reception unit as a simulated tactile sense of a skin being traced.

In the above input/output device, the tactile output unit provides, to the body, a simulated tactile sense of a skin being traced by electrical stimulus.

In the above input/output device, the locus detection unit is formed of a plurality of electrode units.

In the above input/output device, the tactile output unit provides, to the body, a simulated tactile sense of a skin being traced with the plurality of electrode units.

In the above input/output device, the plurality of electrode units are made of a conductive material having flexibility. For example, the plurality of electrode units are made of a cloth having conductivity.

Effects of Embodiments of the Invention

As described above, according to embodiments of the present invention, excellent effects can be obtained that an output can be confirmed as well as more complicated information can be input in a state in which falling into a visually insensitive state is suppressed.

BRIEF DESCRIPTION OF THE DRAWINGS

FIG. 1 is a configuration diagram illustrating a configuration of an input/output device according to an embodiment of the present invention.

FIG. 2 is a configuration diagram illustrating a configuration example of an input unit 101 of the input/output device according to the embodiment of the present invention.

FIG. 4 is an explanatory diagram illustrating stenography words as an input locus.

DETAILED DESCRIPTION OF ILLUSTRATIVE EMBODIMENTS

Figure 3A:
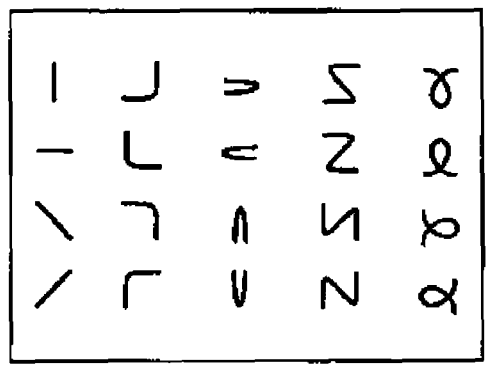
FIG. 3A is an explanatory diagram illustrating an example of simplified symbols as a locus to be input.

Hereinafter, an input/output device according to an embodiment of the present invention will be described with reference to FIG. 1. The present input/output device includes an input unit 101, a locus detection unit 102, a pattern determination unit 103, a transmission unit 104, a reception unit 105, and a tactile output unit 106.

The locus detection unit 102 detects a locus traced by the input unit 101 attached to the body. The pattern determination unit 103 determines an input pattern based on the locus detected by the locus detection unit 102. The transmission unit 104 transmits the input pattern determined by the pattern determination unit 103 as input information to an external device (not shown). The reception unit 105 receives output information transmitted from the external device (not shown).

The tactile output unit 106 provides, to a body, the output information received by the reception unit 105 as a simulated tactile sense of a skin being traced. The tactile output unit 106 outputs the simulated tactile sense to a skin of a body to which the input unit 101 is attached.

For example, the input unit 101 is formed of a plurality of electrode units 111 having flexibility as shown in FIG. 2. The electrode units 111 are made of, for example, a cloth having conductivity and is connected by a wiring 112 that consists of a yarn having conductivity. Furthermore, the input unit 101 is provided, for example, at the back surface of a sleeve portion 201 of clothing (garment), and is attached to a forearm 202. The electrode units in of the input unit 101 configured in this way are in contact with a skin of the forearm 202.

The wiring 112 to which the electrode units 111 are connected is connected to a microcomputer 203. As is well known, the microcomputer 203 includes a CPU (Central Processing Unit), a main storage device, an external storage device, a network connection device and the like, and a program developed to the main storage device causes the CPU to operate, thereby achieving the respective functions described above.

For example, the locus detection unit 102 detects a locus traced by the input unit 101 by measuring the capacitance change of each of the divided electrode unit 111 (refer to Non-Patent Document 4).

The pattern determination unit 103 stores character image data, for example, by associating it with the corresponding character data (text data). The pattern determination unit 103 performs matching between the input pattern based on the locus detected by the locus detection unit 102 and the stored image data, and outputs character data corresponding to the matched image data when the matching is determined within the set upper limit.

Figure 3B:
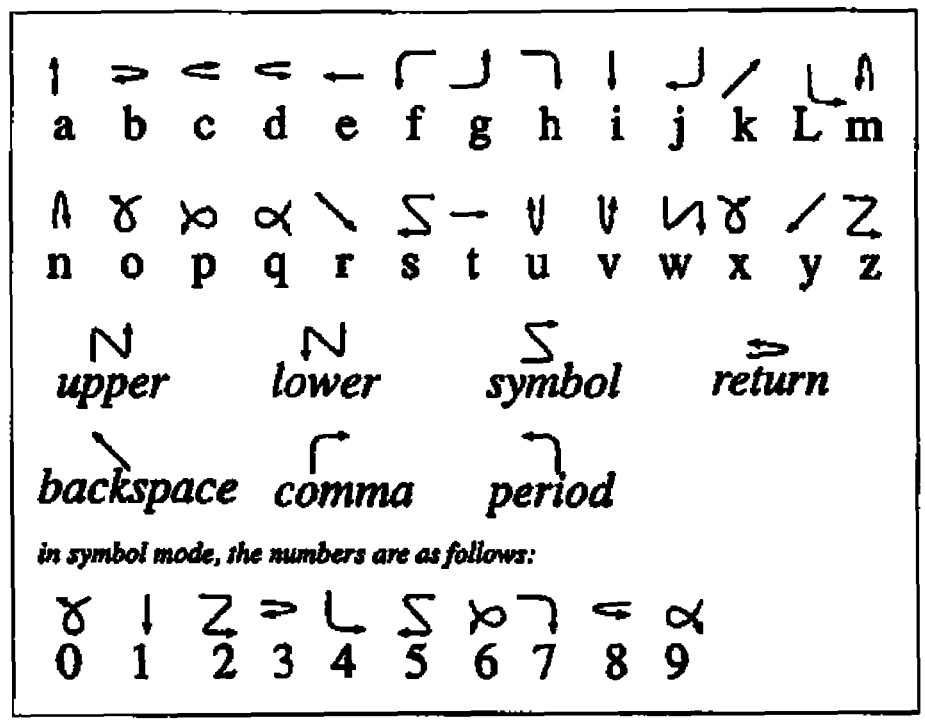
FIG. 3B is an explanatory diagram illustrating an example of simplified symbols as a locus to be input.
Figure 4:
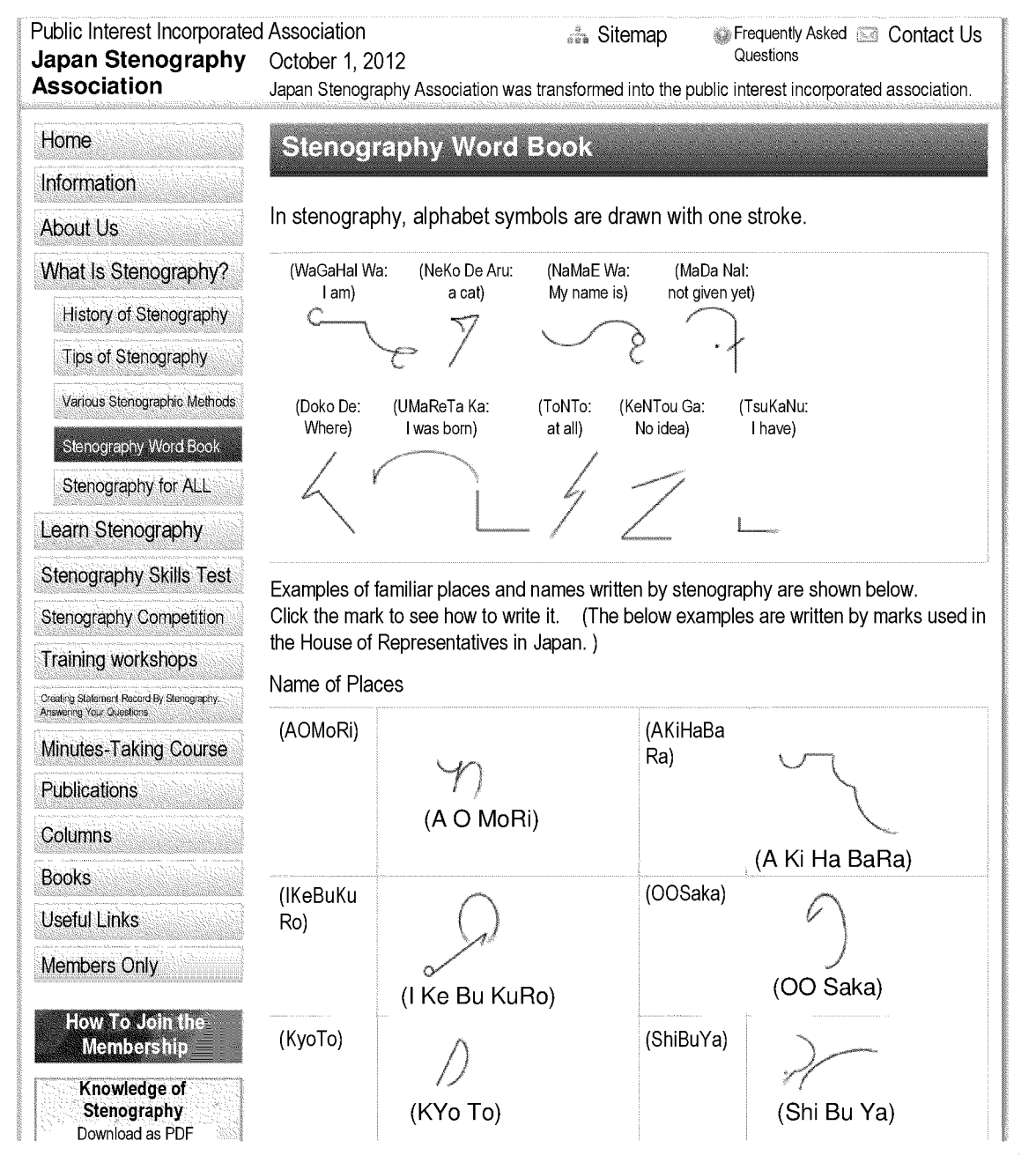

The locus may be a simplified symbol, for example, as shown in FIGS. 3A and 3B (refer to Patent Literature 1). FIG. 3A is FIG. 1 of Patent Literature 1, and FIG. 3B is FIG. 2 of Patent Literature 1. Furthermore, the locus may be a symbol such as a stenography word as shown in FIG. 4 (refer to Non-Patent Literature 3). In these cases, the pattern determination unit 103 may store image data of a symbol by associating it with the corresponding character or character string data. As a result, more complicated information can be input by a simple symbol locus. In this way, information of the character or character string determined by the pattern determination unit 103 is transmitted from the transmission unit 104 to an external device (not shown) for processing.

In addition, for example, the tactile output unit 106 provides, to a body, the output information received by the reception unit 105 as a simulated tactile sense (stimulus) that allows a user to feel as if being traced with a finger, by applying electric stimulus to the skin of the forearm 202 with the divided electrode unit 111 (refer to Non-Patent Literature 5).

The tactile output unit 106 provides, to the skin, the simulated tactile sense as if a character or character string pattern is traced by applying electric stimulus with the electrode unit 111 at a position corresponding to the character or character string pattern that constitutes the received output information. For example, the input information transmitted by the transmission unit 104 is processed by the external device, and the result of the process is transmitted as output information, which is received by the reception unit 105, and provided to the body as a simulated tactile sense by the tactile output unit 106. In addition, alarm information transmitted from the external device is received by the reception unit 105 and provided to the body as a simulated tactile sense by the tactile output unit 106.

As described above, according to embodiments of the present invention, since the locus detection unit detects a locus traced by the input unit attached to the body, the pattern determination unit 103 determines an input pattern based on the detected locus, and the tactile output unit outputs the received output information to the body as a simulated tactile sense of the skin being traced, more complicated information can be input/output in a state in which falling into a visually insensitive state is suppressed.

According to embodiments of the present invention, a user can check the operation and output state of an IT device without using a conventional type input interface such as a touch panel or a keyboard and an output interface such as a display or a speaker. Furthermore, input/output is possible even when it is difficult to operate a keyboard or a touch panel. In addition, since the input/output device according to embodiments of the present invention can be integrated with a garment, it is possible to perform an input operation and the like without being noticed by the people around the user.

It should be noted that the present invention is not limited to the embodiment described above, and it is obvious that many modifications and combinations can be implemented by those having ordinary knowledge in the art within the technical idea of the present invention.

REFERENCE SIGNS LIST

101 Input unit
102 Locus detection unit
103 Pattern determination unit
104 Transmission unit
105 Reception unit
106 Tactile output unit

The invention claimed is:
1. A method comprising:
   detecting, by a input/output device, a locus traced by an input attached to a body;
   determining, by the input/output device, an input pattern based on the locus;

transmitting, by the input/output device, the input pattern determined based on the locus receiving, by the input/output device, first output information, wherein the first output information is a first pattern that matches the locus traced by the input; and providing, by a tactile output of the input/output device to the body, the first output information as a simulated tactile sense of tracing the first pattern on skin of the body.

2. The method according to claim 1, wherein the tactile output provides, to the body, the simulated tactile sense of tracing the first pattern on the skin as electrical stimulus that is applied to the skin.

3. The method according to claim 1, wherein detecting the locus traced by the input attached to the body comprises detecting the locus using a plurality of electrodes.

4. The method according to claim 3, wherein the tactile output provides, to the body, the simulated tactile sense of the skin being traced through the plurality of electrodes.

5. The method according to claim 3, wherein the plurality of electrodes are made of a conductive material having flexibility.

6. The method according to claim 3, wherein the plurality of electrodes are made of a cloth having conductivity.

7. The method according to claim 1, wherein transmitting the input pattern comprises transmitting the input pattern to an external device, and wherein receiving the first output information comprises receiving the first output information from the external device.

8. The method according to claim 1 further comprising:
receiving, by the input/output device, second output information; and
providing, by a tactile output of the input/output device to the body, the second output information as a simulated tactile sense of tracing a second pattern on the skin of the body, wherein the second pattern that is traced on the skin is different than the first pattern that is traced on the skin.

9. An device comprising:
a plurality of electrodes configured to be attached to a body;
a memory comprising instructions;
one or more processors in communication with the memory, wherein the one or more processors execute the instructions to:
detect a locus traced on the plurality of electrodes;
determine an input pattern based on the locus;
transmit the input pattern;
receive first output information, wherein the first output information is a first pattern that matches the locus traced on the plurality of electrodes; and
provide the first output information as a simulated tactile sense of tracing the first pattern on skin of the body through the plurality of electrodes.

10. The device according to claim 9, wherein the plurality of electrodes are made of a conductive material having flexibility.

11. The device according to claim 10, wherein the plurality of electrodes are made of a cloth having conductivity.

12. The device according to claim 9, wherein the instructions cause the one or more processors to transmit the input pattern to an external device, and wherein the instructions cause the one or more processors to receive the first output information from the external device.

13. The device according to claim 9, wherein the plurality of electrodes provides, to the body, the simulated tactile sense of tracing the first pattern on the skin as electrical stimulus that is applied to the skin.

14. The device according to claim 9, wherein the instructions further cause the one or more processors to:
receive second output information; and
provide the second output information as a simulated tactile sense of tracing a second pattern on the skin of the body through the plurality of electrodes, wherein the second pattern that is traced on the skin is different than the first pattern that is traced on the skin.

* * * * *